US007424896B1

(12) United States Patent
Martin et al.

(10) Patent No.: US 7,424,896 B1
(45) Date of Patent: Sep. 16, 2008

(54) AUTOMATIC FLOW SHUT-OFF SYSTEM

(76) Inventors: James B. Martin, 4300 Ivy Ct., Granbury, TX (US) 76049; Lloyd G. Jones, 8412 Ravenswood Rd., Granbury, TX (US) 76049

( * ) Notice: Subject to any disclaimer, the term of this patent is extended or adjusted under 35 U.S.C. 154(b) by 611 days.

(21) Appl. No.: 11/114,748

(22) Filed: Apr. 25, 2005

(51) Int. Cl.
*F16K 13/08* (2006.01)
*F16K 17/36* (2006.01)

(52) U.S. Cl. .................. 137/312; 137/67; 137/68.11; 251/74; 122/504; 122/507

(58) Field of Classification Search .............. 137/312, 137/67, 68.11; 251/67, 73, 74; 122/504, 122/507
See application file for complete search history.

(56) References Cited

U.S. PATENT DOCUMENTS

| 2,798,503 | A | | 7/1957 | Carver et al. |
| 3,920,031 | A | | 11/1975 | Maxfield |
| 4,294,276 | A | * | 10/1981 | Harrison ............... 137/67 |
| 4,305,420 | A | | 12/1981 | Nussdorf |
| 4,930,934 | A | | 6/1990 | Adkins |
| 5,771,916 | A | | 6/1998 | Armenia et al. |
| 6,024,116 | A | | 2/2000 | Almberg et al. |
| 6,117,311 | A | | 9/2000 | Stockhowe et al. |
| 6,253,785 | B1 | | 7/2001 | Shumake, Jr. et al. |
| 6,336,469 | B1 | | 1/2002 | Nixon et al. |
| 6,354,322 | B2 | | 3/2002 | Clark |
| 6,543,471 | B1 | | 4/2003 | Carroll |
| 6,899,122 | B1 | * | 5/2005 | Mele ..................... 137/312 |

* cited by examiner

*Primary Examiner*—Kevin L Lee
(74) *Attorney, Agent, or Firm*—Drude Faulconer

(57) ABSTRACT

An automatic system which includes a tripper unit for actuating a device (e.g. valve-closing actuator) upon contact with water. Basically, the tripper unit is comprised of a housing having a cartridge therein which, in turn, is wrapped with an adsorbent paper which prevents a plunger from moving downward. When a leak occurs, water will flow into the housing and into contact with the absorbent paper which will quickly disintegrate allowing the plunger to move downward to thereby actuate the valve actuator to close the valve. The tripper unit may be a separate component of the system or both the tripper unit and the valve actuator can be incorporated into a single unit.

20 Claims, 10 Drawing Sheets

AUTOMATIC FLOW SHUT-OFF SYSTEM

TECHNICAL FIELD

The present invention relates to an automatic flow shut-off system and more particularly relates to a system for automatically shutting off the water and/or gas supply to an appliance (e.g. hot water heater, commode, washer, etc.) when the appliance ruptures or springs a leak.

BACKGROUND OF THE INVENTION

Almost everyone is familiar with the problems caused by unexpected leaks or overflows in household or commercial appliances such as hot water heaters, commodes, and the like. For example, if the tank of a hot water heater cracks or springs a leak which goes undetected for any period of time, the results can be economically devastating. That is, water will continuously flow into the leaking tank and out onto the floor until the leak is detected and the water is cut off. If the owner is away on vacation or does not promptly become aware of the leak or rupture, the premises quickly floods which, in turn, can cause extensive damage to the affected floors, rugs, etc. Sometimes, the floor surfaces and adjacent furniture are damaged to the extent that they have to be replaced which can be both very expensive and depressing.

The same type of situation may exist where a commode becomes plugged or has a defective flush system. The tank or stool can overflow thereby causing substantial damage to the floor and surrounding area before the water can be turned off. Further, washing machines, ice makers, etc. can develop leaks which, if not quickly discovered, can cause similar damage. Unfortunately, damage caused by such flooding may not be covered under some standard homeowner's insurance policies so the costs for such damages in some instances must be borne solely by the owner.

The possibility of undetected leaks occurring in such appliances has been long recognized and several different approaches have been proposed for addressing this problem. For example; see U.S. Pat. Nos. 2,798,503; 3,920,031; 4,305,420; 5,771,916; 6,024,116; 6,253,785 B1; 6,336,469 B1; 6,543,471 B1; and 6,354,322 B2; all of which disclose systems for shutting off the water and/or gas supply if a leak should occur in a hot water heater.

While all of these references disclose workable solutions, each require at least one of the following: (1) a pan or tray in which the hot water heater is located; (2) connections for electrical power; and/or (3) the installation of a special valve into the supply line(s) thereby making the initial cost and installation thereof relatively expensive for a "do-it-yourselfer" who wishes to retro-fit an already installed appliance.

Accordingly, a need exists for an inexpensive, automatic flow shut-off system which can easily be retro-fitted into the standard plumbing of most already installed, modern household or commercial appliances (i.e. hot water heaters, commodes, etc.) by a person with only minimal plumbing skills.

SUMMARY OF THE INVENTION

The present invention provides an automatic flow shut-off system for shutting off a valve in a water supply line to an appliance when a leak develops at the appliance. The present system does not require that a drain pan be used with the appliance (e.g. hot water heater), requires no electricity for its operation, and requires no specially-designed valves for its installation.

More specially, the system of the present invention includes a tripper unit for actuating a device (e.g. valve-closing actuator) upon contact with water such as will be present when an appliance (e.g. hot water heater, commode, etc.) develops a leak or the like. Basically, the tripper unit has a housing which is positioned in proximity of the appliance and has openings therein which allow any water surrounding the appliance to enter into the housing. A downwardly-biased plunger is slidably mounted in the housing and rests on and is prevented from moving downward by a water reactive material for so long as the material remains dry. Preferably, this material is comprised of an absorbent paper material (e.g. common-available paper-towels) which when of a proper thickness is strong enough to resist the movement of the plunger when the material is dry, but is one which will quickly weaken and disintegrate upon contact with water.

When a leak or the like develops around the appliance, water will flow into the housing and into contact with the absorbent paper. In a very short period of time (1-2 minutes or less), the paper will weaken and disintegrate to the point that the downwardly-biased plunger will be propelled downward in the housing to thereby actuate the valve actuator and shut off the supply of water to the appliance. As will be recognized, this can prevent significant damage to the areas surrounding and in proximity of the appliance.

In one embodiment of the automatic shut-off system of the present invention, the tripper unit is a separate component which operates the remote valve actuator of the system. In this embodiment, which is primarily used with hot water heaters, the valve actuator is comprised of a housing, which, in turn is affixed to the water supply line over the valve. A spring in the housing is latched in a "cocked" position by a lever on the housing. One end of the lever is coupled to the plunger of the tripper unit by a length of flexible material, e.g. cord. chain. When a leak occurs and the plunger moves downward, the spring is released to thereby move the valve to its closed position. Further, this tripper unit may include a switch to shut the supply of gas off to a gas-fired hot water heater when a leak occurs.

In another embodiment of the present invention, the tripper unit and the valve actuator are incorporated into a single unit. In this embodiment, which is primarily used with commodes, washers, etc., the unit is comprised of a housing which, in turn, is adapted to be positioned on the floor adjacent to the commode. The housing has openings therein for allowing flow of water into the housing. An arm is attached to the stem of a ball valve to rotate the stem which, in turn, moves the valve between its open and closed positions.

One end of the arm is biased downward and rests on a plunger in the housing which, in turn, is prevented from moving downward by a water reactive material, e.g. paper towel material. When a leak occurs, water enters the housing and reacts with the absorbent paper to then allow the plunger to move downward in the housing to thereby free the arm to rotate to close the valve.

BRIEF DESCRIPTION OF THE DRAWINGS

The actual construction operation, and apparent advantages of the present invention will be better understood by referring to the drawings, not necessarily to scale, in which like numerals identify like parts and in which.

DESCRIPTION OF THE PREFERRED EMBODIMENTS

Figure 1:
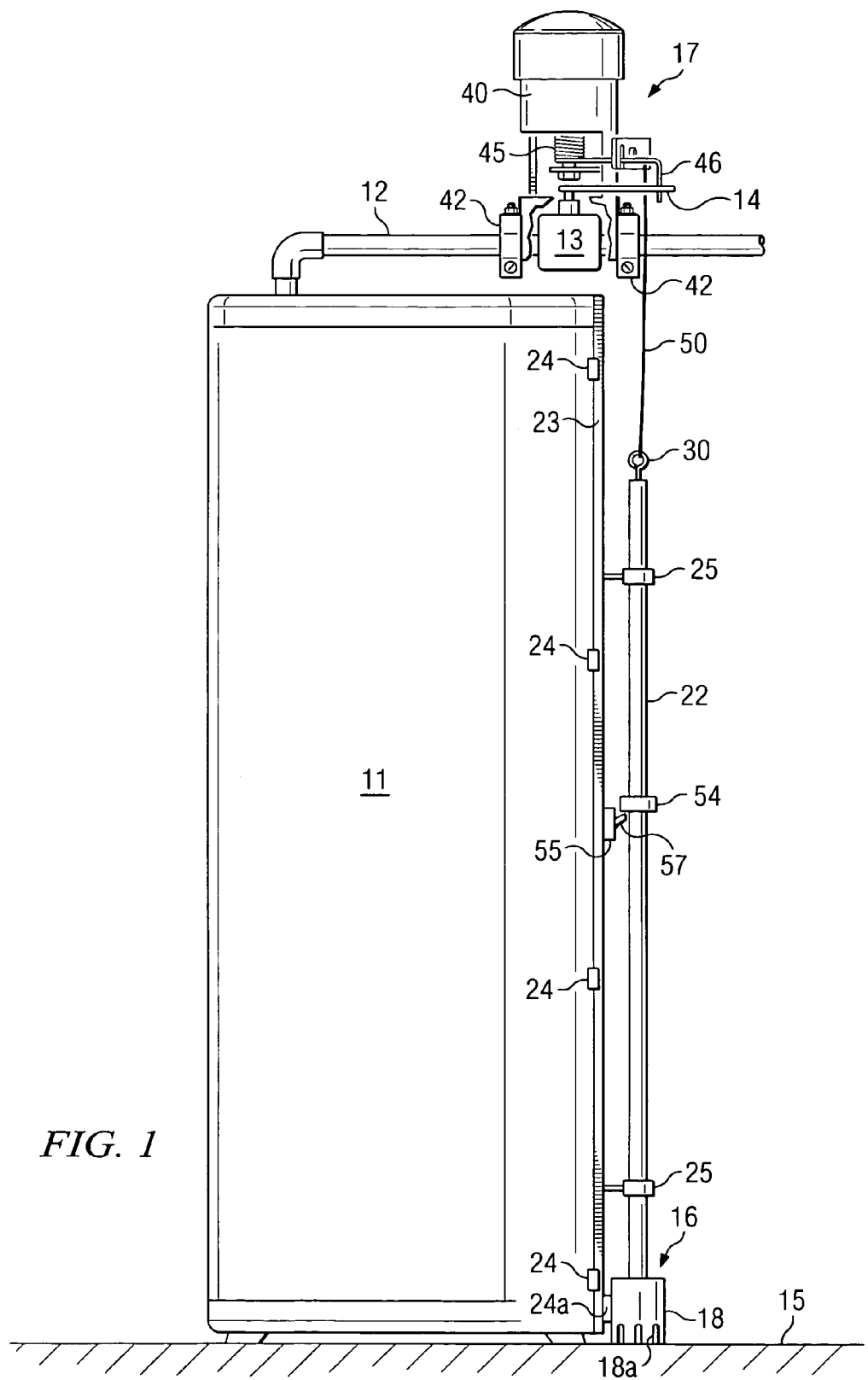
FIG. 1 is a perspective side view, partly in section, of a typical hot water heater having one embodiment of the automatic flow shut-off system of the present invention installed thereon.

Referring more particularly to the drawings, FIG. 1 illustrates the automatic flow shut-off system 10 of the present invention when used with a typical hot water heater 11. Water heater 11 is positioned on a substantially horizontal floor 15 and has a water supply line 12 connected thereto. It should be understood that shut-off system 10 can be installed at the time of the original installation of a water heater or the system may be bought as a kit and installed into already installed hot water heaters. Again, it is pointed out that it is not necessary for the hot water heater to be positioned in a pan or the like for the present invention to function as is the case with several prior art devices.

Typically, the existing plumbing for many installed water heaters include a standard type ball valve 13 for controlling the flow of water through line 12 and such a standard ball valve can easily be installed if required. As will be understood in the art, ball valve 13 remains open during normal operation to supply water to tank of water heater 11, as needed, to keep the tank at its desired capacity. Ball valve 13 typically has a lever or arm 14 attached to its stem (not shown) by which the ball can be manually rotated through a 45° arc to open and close valve 13, as will be understood in the art.

Flow shut-off system 10, as shown in FIG. 1, is comprised of a tripper unit 16 and a valve actuator unit 17. Tripper unit 16 is adapted to be positioned on floor 15 adjacent the lower end of water heater 11 so that it will detect any significant water that might accumulate at that point. That is, if the tank of water heater 11 should rupture or spring a leak, tripper unit 16 senses the leaking water and actuates valve actuator unit 17 to shut off the flow of water through line 12 as will be described below.

Figure 2:
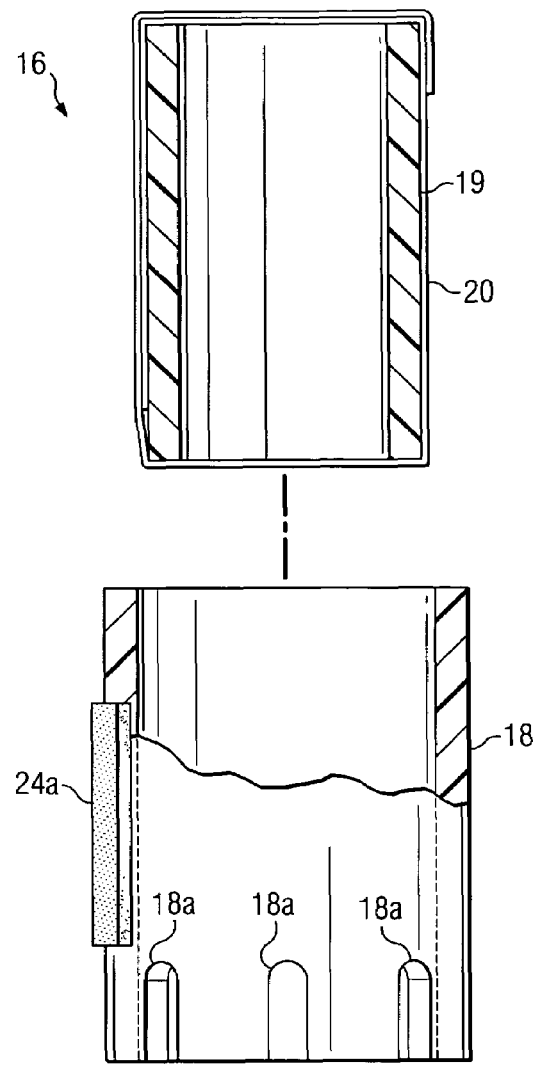
FIG. 2 is an enlarged, exploded view of the tripper unit of the automatic flow shut-off system shown in FIG. 1.

Referring now to FIG. 2, the details of the preferred tripper unit 16 will now be set forth. While it should be understood that the components of tripper unit 16 may be constructed from any appropriate material (e.g. metal, other plastics, etc.), preferably they are made of PVC or like materials. More specifically, tripper unit 16 is extremely simple but highly effective and is comprised of a relatively short, elongated, cylindrical housing 18 and a water detection cartridge 19 which telescopically slides within housing 18 when tripper unit 16 is assembled.

For example, housing 18 may be constructed of a 2½ inch length of 1½ inch OD schedule 40 PVC pipe or the like. Weep holes 18a are provided around the lower periphery of the housing to allow the entry of water into the housing. Cartridge 19 is preferably constructed of a 2¼ inch length of 1 inch OD schedule 40 PVC pipe so that it will removably fit within housing 18. For a purpose explained below, a water reactive material is loaded onto cartridge 19 which will quickly begin to weaken and disintegrate once it comes into contact with water.

While several water reactive materials can be used (e.g. sugar, salts, etc. in disk or pad form or the like), preferably a water absorbent paper 20 (e.g. common "paper towels") is used in the present invention. The absorbent paper, once wrapped onto the cartridge 19, is of a sufficient thickness to provide the resistive force necessary to keep tripping unit 16 from "tripping" as long as the paper remains dry. While a single thickness absorbent paper (i.e. in pad form) may be used, common paper towels work well when cut into approximately 1 inch wide strips and wrapped around the length and both ends of the cartridge (see 20 in FIG. 2).

The length of the strip 20 will depend on the numbers of layers of paper (i.e. the number of wraps, only two shown in FIG. 2) that will be required across the upper end of cartridge 21 to provide the necessary thickness (i.e. resistive force) to prevent tripping of unit 16 until the paper becomes wet. For example, an approximately 3 foot long, 1 inch wide strip of a quality paper towel (e.g. BOUNTY®), when wrapped around cartridge 19, will provide approximately 6 layers of absorbent paper across the ends of cartridge 19 which has proven to be adequate for this purpose. Once a cartridge 19 is properly prepared, it is pushed into the housing 18. It should be understood that cartridges 19 can be factory prepared and sold as replacement parts or a user can easily remove a used cartridge, rewrap, and replace it when necessary.

Tripper unit 16 includes a plunger 22 which rests on the dry, water reactive material 20 which extends across the top of cartridge 19. As shown in FIG. 1, plunger 22 is comprised of rod or the like of a heavy material. For example, plunger 22 may be formed from a 4 foot length of a 4 inch iron or steel rod. To steady and guide rod 22, a vertical guide strip 23 is affixed along the height of the water heater 11 by any means, e.g. commercial grade hook tape (VELCRO®) ¾ (only four attachment points shown in FIG. 1). Guide strip 23 can be of any suitable material (e.g. preferably a wood strip, 1 inch by 1 inch by 5 feet long). One or more guides 25 (e.g. eye bolts, only two shown in FIG. 1) are attached to strip 23, preferably before the strip is attached to the heater 11. When assembled, rod 22 is slidably positioned through guides 25 for a purpose discussed below.

In operation, tripper unit 16 is positioned vertically next to a water-using appliance, e.g. hot water heater 11 and may be secured thereto or to strip 23 by any appropriate means, e.g. hook tape 24a. If the appliance should leak water for any reason, the water will begin to accumulate on floor 15 and will flow through openings 18a in housing 18 and into contact with the water absorbent material 20 on cartridge 19. The water will immediately begin to react with material (i.e. wick upward into all of the layers of the absorbent paper) and will quickly begin to weaken and disintegrate the paper across the upper end of cartridge 19 which, in turn, is resisting the downward movement of plunger 22. Once the paper sufficiently weakens, the weight of the metal bar 22 will cause the bar to break through the weakened paper 20 and drop approximately 1½ inches with authority to actuate valve actuator 17, as will be described in further detail below.

As an example of how quick the tripper unit 16 will respond, it has been found that it takes only approximately 1 minute or less for unit 16 to trip once water which has accumulated only to a depth of ⅛ inch or less on floor 15. Further, it has been found that unit 16 will even trip within a couple of days when only slight moisture remains on the floor for an extended time. In either event, tripper unit 16 responds and the water to heater 11 is shut off before any significant damage, if any at all, can occur.

Figure 3:
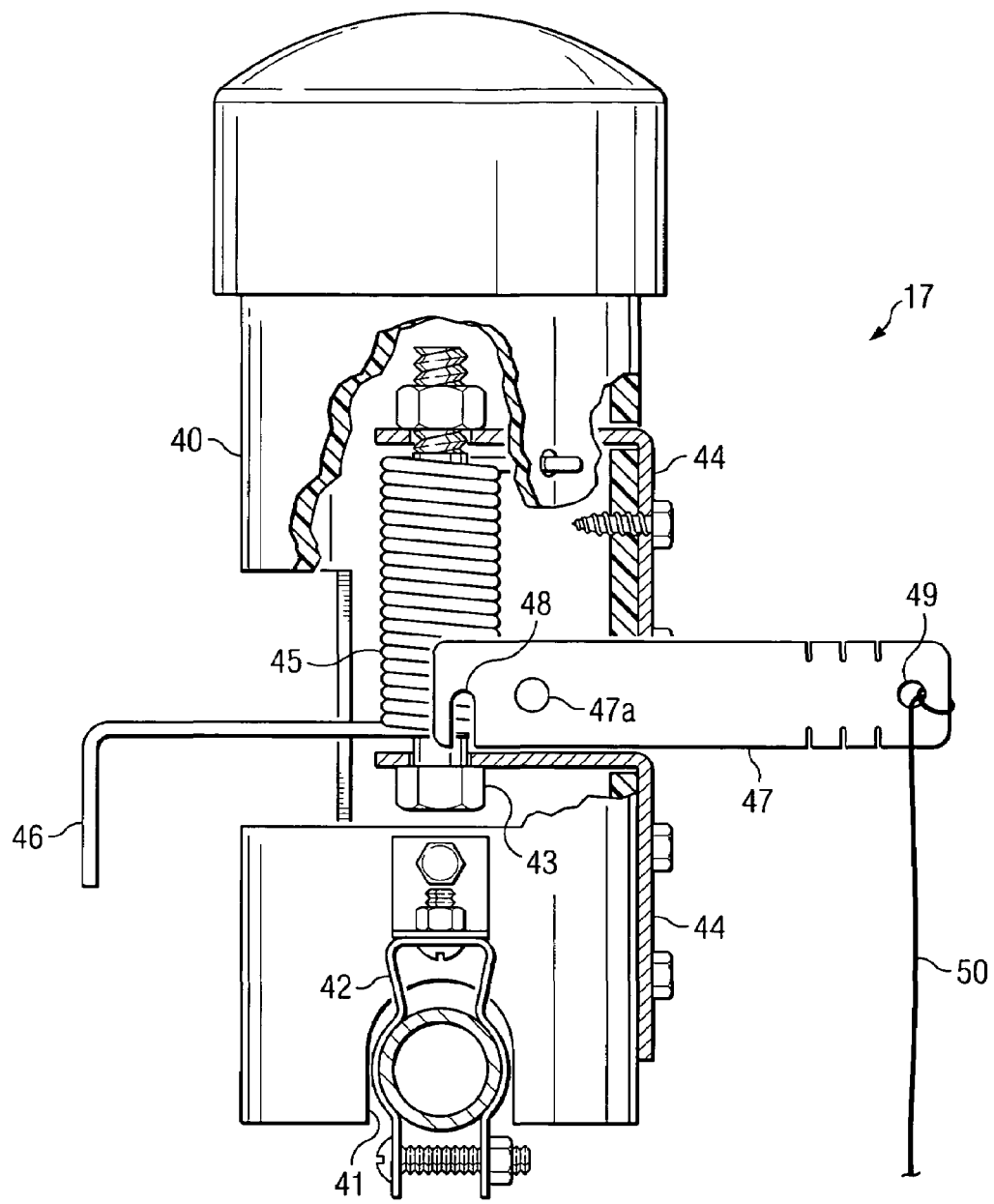
FIG. 3 is an enlarged view, partly in section, of the valve actuator unit of the present invention for actuating a ball valve in the automatic flow shut-off system shown in FIG. 1.

While tripper unit 16 can actuate a number of devices, one such device is valve actuator unit 17 of the present automatic flow shut-off system 10, shown in FIGS. 1 and 3 and discussed briefly above. Valve actuator unit 17 is designed to shut off a ball valve 13 in line 12. Referring now to FIG. 3, unit 17 is comprised of a housing 40 having diametrically opposed slots 41 (only one shown in FIG. 3) formed through the lower end of the wall of the housing. These slots are adapted to fit over and receive a water supply line 12 (FIG. 1) when actuator unit is placed over ball valve 13. Pipe clamps 42 or the like are secured to housing 40 adjacent to the slots 41 by which actuator 17 is secured in place onto line 12.

A shaft 43 is secured between supports 44 in housing 40 and has a torsion spring 45 positioned thereon with one end of the spring being secured to upper support 44 and the other or free end extending outward from the shaft and terminating in a 90° bend which, in turn, forms leg or impact surface 46. A latch lever 47 is rotatably mounted about pivot 47a on the side of housing 40 and has a hole 49 or the like at one end and a latching notch 48 near the other end. Notch 48 is adapted to receive and releasably latch the free end of the spring 45 after the free end of the spring has been rotated at least 90° against its bias. This compresses spring 45 and valve actuator 17 is now in its "cocked" position, as will be explained below.

In operation, slots 41 are positioned over line 12 and clamps 42 are secured around the pipe to secure housing 40 over ball valve 13. The free end of spring 45 is then rotated approximately 90° against the natural bias of the spring and lever 47 is rotated about pivot 47a to bring notch 48 down over the free end of the spring thereby effectively latching the spring in its cocked position. Arm 14 on valve 13 is then rotated, again approximately 90° in the same direction as that in which the spring was rotated to thereby move the valve to its open position.

Preferably, when the valve is in its full open position and spring 45 is in a cocked position, the leg 46 of the cocked spring 45 will not be in contact with the arm 14 but instead a small space will exist between the two, for a purpose explained below. Lever 47 is connected to plunger 19 by a connector means 50 (e.g. flexible cord, chain, etc.) which is connected at one end to the eye bolt 30 which is welded or otherwise secured on the upper end of plunger 22 and at its other end to the hole 49 in one end of the lever 47.

In routine operation, valve 13 will remain open and water will flow through line 12 into the tank of water heater 11, as needed. However, when a leak of any kind occurs, water will flow onto floor 15 and into the housing of tripper unit 16. As fully explained above, the water causes the unit 16 to trip thereby allowing plunger 19 to rapidly move downward which, in turn, pulls the attached connector means 50 downward to rotate latch lever 47 and disengage the free end of spring 45 from its cocked position.

When unlatched, the free end of spring 45 begins to accelerate towards it relaxed position with substantial force. The small space deliberately left between leg 45 and arm 14 allows the spring to build up momentum which, in turn, produces an "impact" effect when leg 45 actually contacts arm 14 of the valve. This sudden impact aids in insuring that the valve will be moved to its full closed position as spring 45 rotates back to its original position and pushes arm 14 on the valve ahead of it.

While the automatic flow shut-off system 10, as described above, shuts off the flow of water upon the development of a water leak, in some gas-fired water heaters, it is also desirable to shut-off the gas at the same time the water is cut off. As is well known in the art, the circuitry for a typical gas-fired water heater includes a pilot light, a thermocouple, and an electrically-operated valve for controlling the flow of gas. As long as the pilot light continues to burn, the heat on the thermocouple generates a charge (i.e. a millivolt) to keep the valve open. If the light goes out, the valve closes and the gas supply is shut off.

Tripper unit 16, as shown in FIG. 1, is capable of shutting the flow of gas to a pilot light at the same time the water is shut off to heater 11. To do this, a switch 55 (FIG. 1) is affixed the side of heater 11, preferably affixed to guide strip 23 before the strip is affixed to the water heater. Switch 55 is appropriately wired into the circuitry for the pilot light. A collar 54 or the like is affixed onto rod 22 to move downward therewith to contact and move a throw 57 on switch 55 downward to open the switch. This breaks the circuit, which then closes the gas supply valve just as if the pilot light had gone out.

Figure 4:
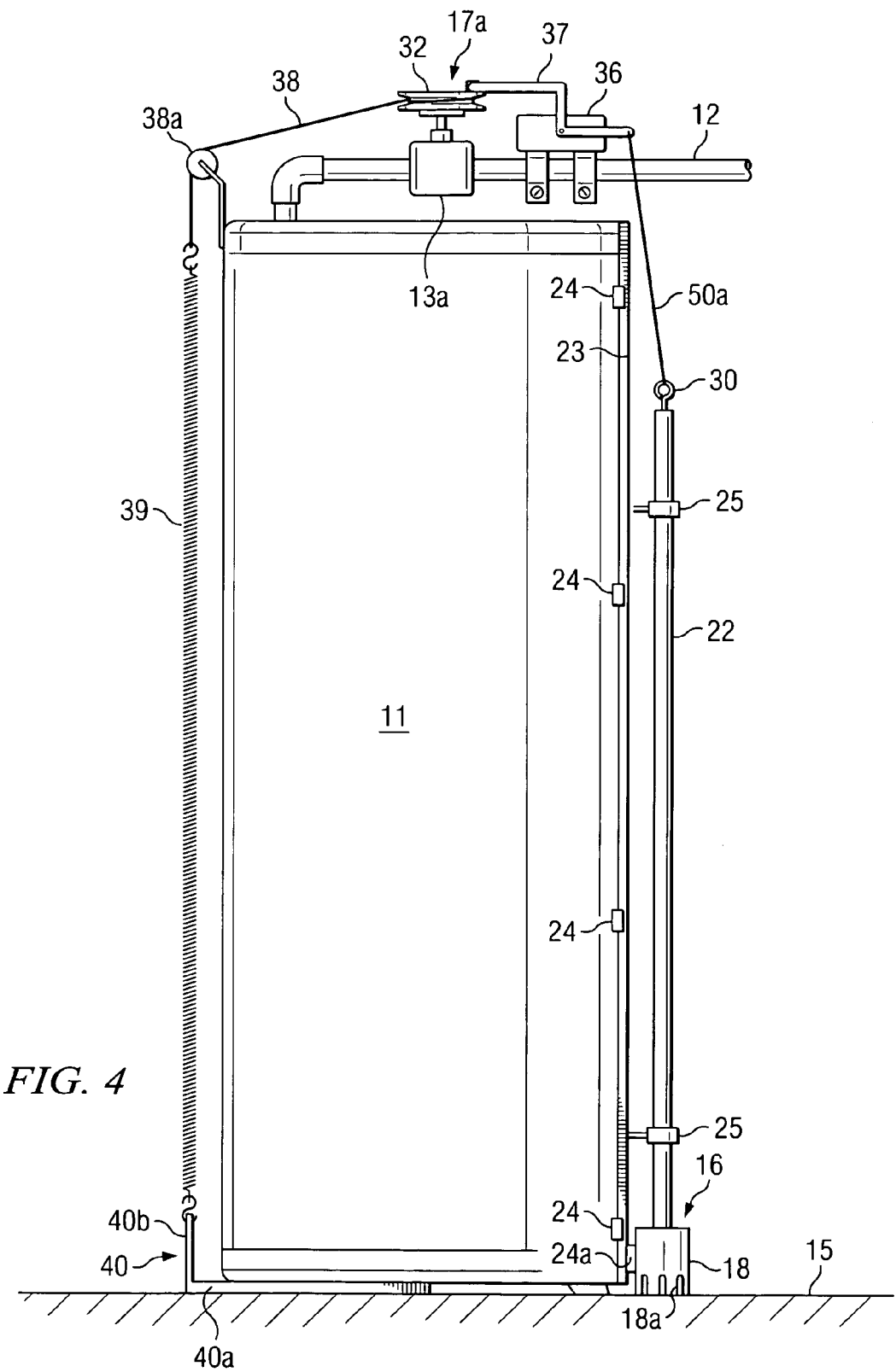
FIG. 4 is a perspective side view, partly in section, of a typical hot water heater having another embodiment of the valve actuator unit of the present invention installed thereon.
Figure 5:
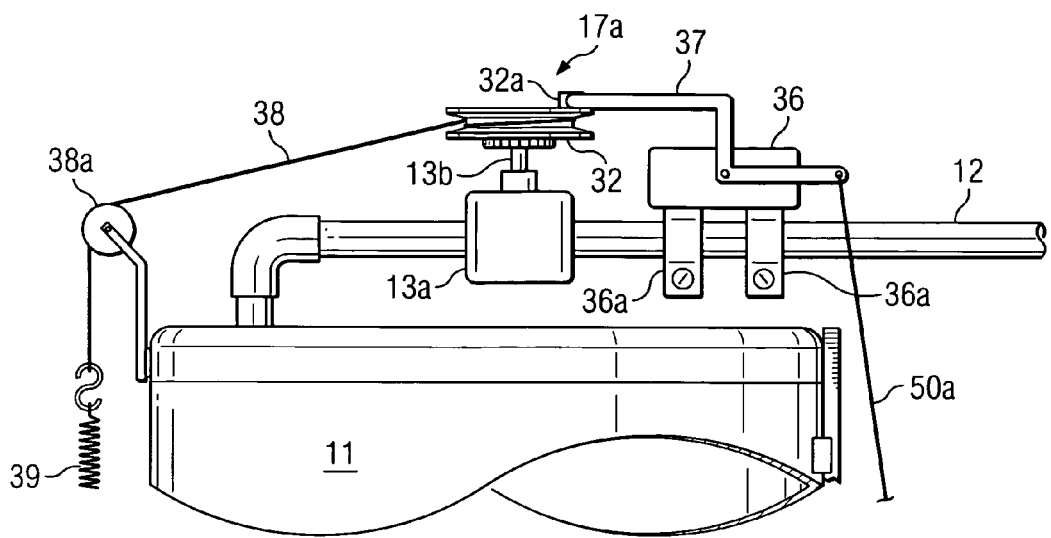
FIG. 5 is an enlarged perspective view of the valve actuator unit for actuating a gate valve in the system of FIG. 4.

Valve actuator unit 17 is adapted to close a standard-type ball valve such as those commonly found in the water supply lines to many previously installed water heaters. In another embodiment of the present invention, FIGS. 4 and 5 illustrate a valve actuator unit 17A that is adapted to close a standard-type gate valve 13a, also commonly found in water supply lines to some installed hot water heaters. Valve actuator unit 17A is comprised of a spool (e.g. 4 inch pulley 32) which is adapted to be fitted onto the stem 13b of valve 13a after the standard handle 35 (shown only in dotted lines in FIG. 6) of the valve has been removed. While any type of adapter can be used to affix pulley 32 to the stem, preferably, the pulley has a non-round recess which is adapted to fitted directly over the non-round stem of the valve so that the stem will rotate when the pulley is rotated.

A latch support 36 is secured onto supply line 12 by clamps 36a or the like and has a latch arm 37 pivotably mounted thereon. One end of arm 37 is attached to a flexible connection means 50a (e.g. cord, chain, etc.) and the other end of arm 37 is adapted to engage a detent 32a on the upper surface of pulley 32 when the arm is in its unrotated or latched position for a purpose described later. A flexible member 38 (e.g. a length of lawnmower starter pull cord) has one end connected to spool 32 and its other end connected to one end of a bias means 39 (e.g. tension spring of the type used on screen doors). The other end of spring 39 is anchored to floor 15 by any appropriate means. For example, one leg 40a of an L-shaped, metal bracket 40 can be slid under the bottom of water heater 11, the weight of which will hold the bracket in place. The lower end of spring 39 is then connected to the other leg 40b of the bracket to anchor the spring to the floor 15.

To aid in the smooth movement of flexible member 38, member 38 can be passed over idler pulley 38a which, in turn, can be secured to heater 11 by any appropriate means, i.e. adhesive, hook tape, etc.) as shown in the FIG. 1f desired, a similar idler pulley (not shown) can be affixed to top of heater at the other side thereof to aid in movement of flexible means 50a.

In operation, the handle is removed from gate valve 13a and pulley 32 is mounted thereon. Using spool 32, close gate valve 13a and then rotate knob 35 counterclockwise three complete turns to open the valve. Next, wind four revolutions of power cord 38 onto spool 32 and latch spool 32 against clockwise rotation by engaging latch arm 37 against detent 32b on spool 32. Extend spring 39 and attach it to power cord 38. The actuator 17A is now in a "cocked" position. When any water accumulates on floor 15, the water reactive material (e.g. paper) 20 begins to immediately weaken and tripper unit 16 trips as explained above. As rod 22 drops under gravity, it pulls means 50a downward which, in turn, rotates arm 37 out of engagement with detent 32a. This allows the bias of spring 39 to pull cord 38 downward to rotate spool 32 to close gate valve 13a. The cord 38, spring 38, etc. are sized to insure at least 3 rotations of knob 35 on valve 13a.

Figure 6:
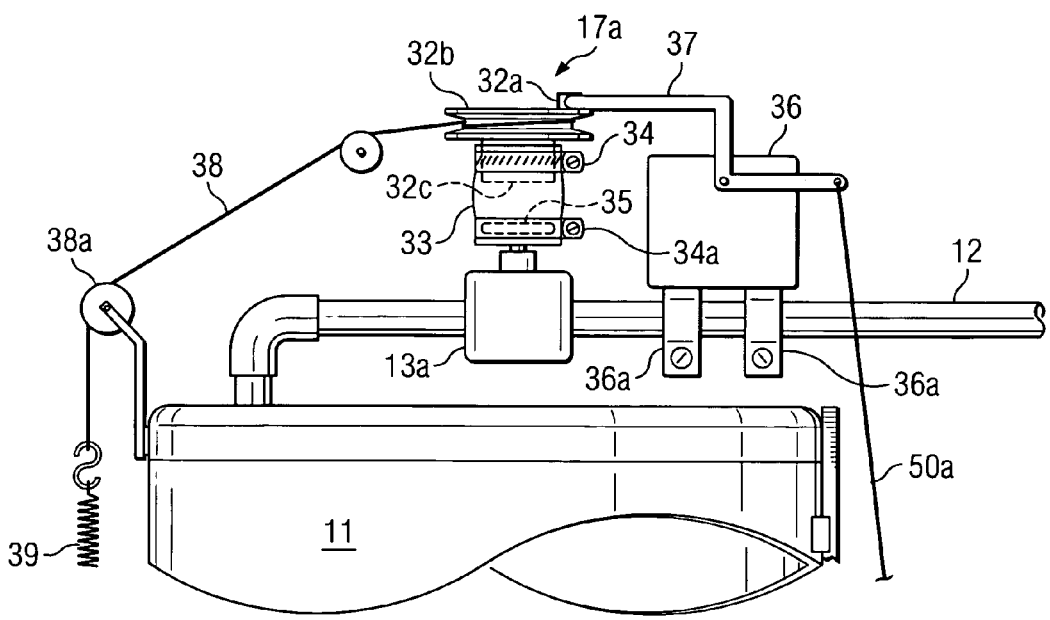
FIG. 6 is an enlarged perspective view of a further embodiment of the valve actuator unit for actuating a gate valve in the system of FIG. 4.

FIG. 6 illustrates a further embodiment for attaching pulley 32a to the stem of valve 13a. Pulley 32b has a shaft 32c which is positioned into the top end of an elastic coupling 33 (e.g. a short length of a rubber radiator hose) and is secured therein by hose clamp 34. The lower end of coupling 33 is adapted to be frictionally fitted over the standard handle 35 of gate valve 13a in water supply line 12. Coupling 33 is further secured against rotation with respect to handle 35 by hose clamp 34a. The operation of the valve actuator 17B in FIG. 6 is otherwise identical to that described above in relation to the embodiment of FIG. 5.

Figure 6A:
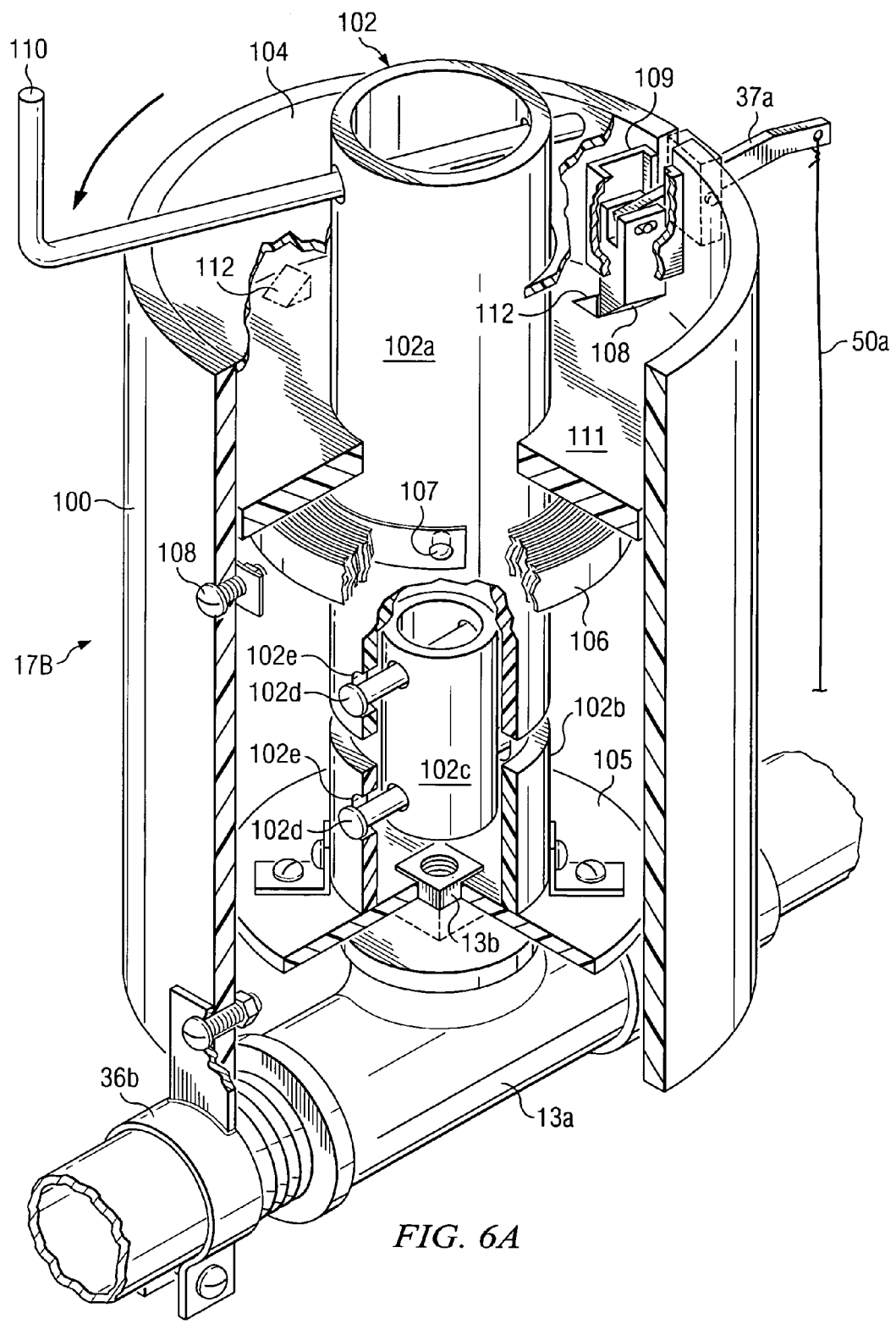
FIG. 6A is an elarged perspective view, partly in section, of a preferred embodiment of the valve actuator unit for actuating a gate valve in the system of FIG. 4.

FIG. 6A discloses another but a simplified, preferred embodiment of a valve actuator unit 17B that is adapted to close a standard-type gate valve 13a such as that described above. Valve actuator unit 17B is comprised of a housing 100 which is adapted to be positioned over water supply line 12 and secured thereto by clamps 36b or the like. A shaft 102 is rotatably mounted through the top 104 of housing 100. Shaft 102 is preferably made in two segments, 102a and 102b which are coupled together by a link 102c which, in turn, has pins 102d thereon which slide vertically within slots 102e in the respective segments. By making shaft 102 in segments, it allows vertical adjustment for varying heights of the stem 13b of different gate valves 13a.

Shaft 102 has a first plate 105 attached to the lower end thereof which has a opening (e.g. square) therethrough which, in turn, is configured to fit over stem 13b of gate valve 13a whereby the stem is rotated with plate 105. A coiled spring 106 surrounds shaft 102 and has one end connected to shaft 102 by screw 107 or the like and the other end connected to housing 100 by screw 108 or the like. Preferably, spring 106 is a sturdy, clock spring capable of generating sufficient torque (e.g. about 8 foot-pounds) to easily rotate stem 13a upon actuation of unit 17B. Such springs are available from clock-spring manufacturers, e.g. Associated Spring, Milwaukee, Wis.

A second or stop plate 111 is affixed shaft 102 for rotation therewith and has a stop 112 on its upper surface. A guide slot 109 is affixed to the inside of the upper end of housing 100 and has a detent 110 slidably positioned therein. Detent 110 is slidably connected to latch arm 37a which, in turn, is connected to tripper unit 16 (see FIG. 4) by flexible means 50a. The lower end of detent 110 has a cam surface as does one side of stop 112 for a purpose described below.

In operation, the handle (not shown) is removed from the stem 13b of gate valve 13a and unit 17B is placed over the valve 13a when the valve is in its fully closed position. The opening in plate 105 is positioned onto stem 13b after which housing 100 is secured onto water supply line 12. Due to the two-piece construction of shaft 102, the positioning of plate 105 can be easily adjusted for the height of stem 13b of a particular gate valve 13a. Shaft 102 and hence, plate 105 are then rotated counterclockwise several turns (e.g. four) to move valve 13a to its fully open position. A removable crank 113 is preferably inserted through openings in the upper end of shaft 102 to aid in rotating the shaft.

As shaft 102 is rotated to open the valve against the bias of spring 106, the cam surface of stop 112 will contact the cam surface of detent 110 on each rotation to thereby lift the detent and allow continued counterclockwise rotation of the shaft. Once the valve has been moved to its open position, the force on crank 113 is relaxed and spring 106 will bias shaft 102 in a clockwise direction until the vertical surface on stop 112 engages the vertical surface of detent 110 which latchs the valve in its open position. When a leak actuates tripper unit 16, the plunger therein will pull flexible means 50a downward to cause arm 37a to move detent 110 upward to thereby release plate 111 for rotation. This allows the bias of spring 106 to rotate shaft 102 and attached plate 105 in a clockwise direction to close gate 13b.

Figure 7:
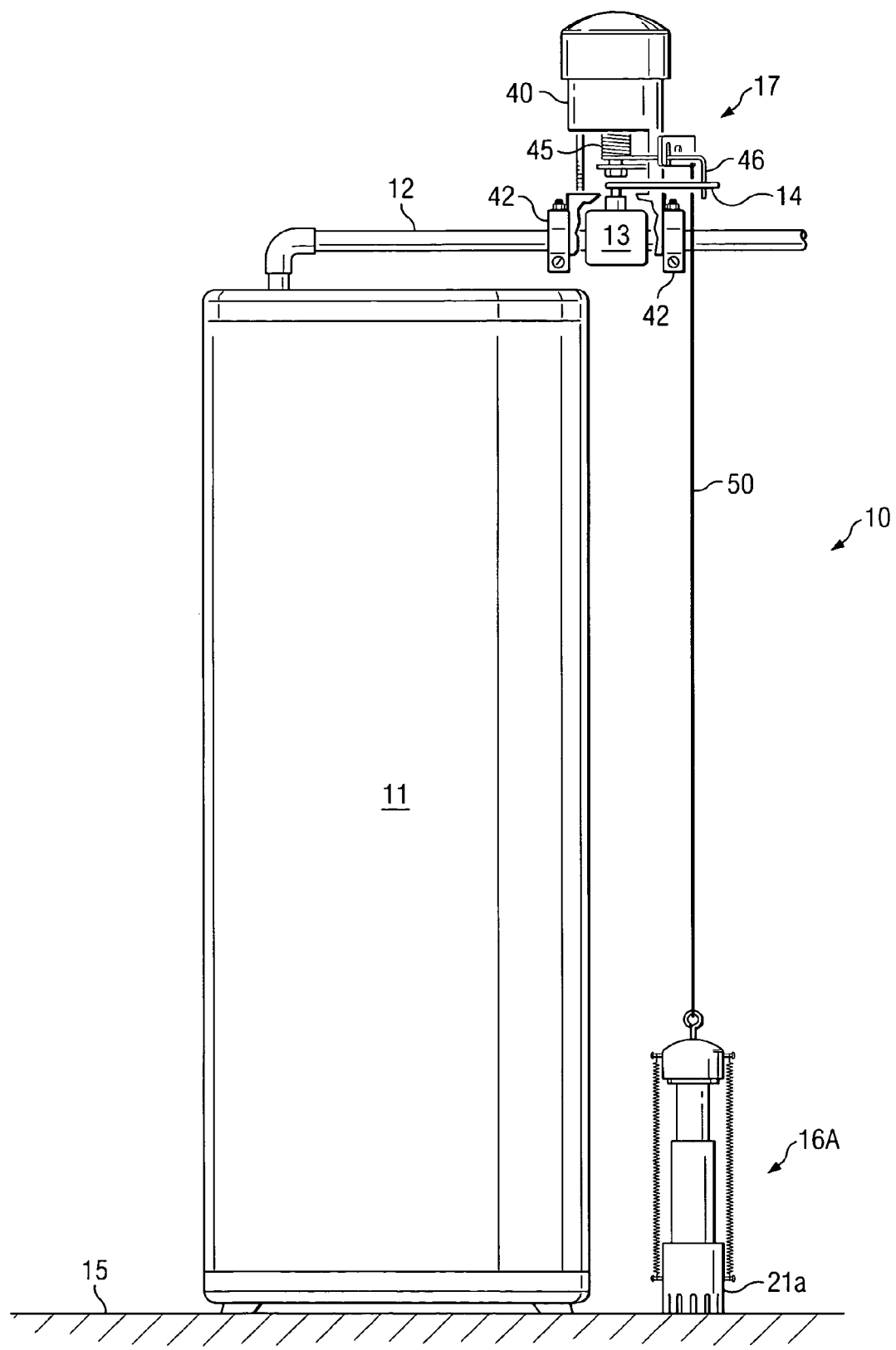
FIG. 7 is a perspective side view, partly in section, of a typical hot water heater having another embodiment of the tripper unit of the present invention installed thereon.
Figure 8:
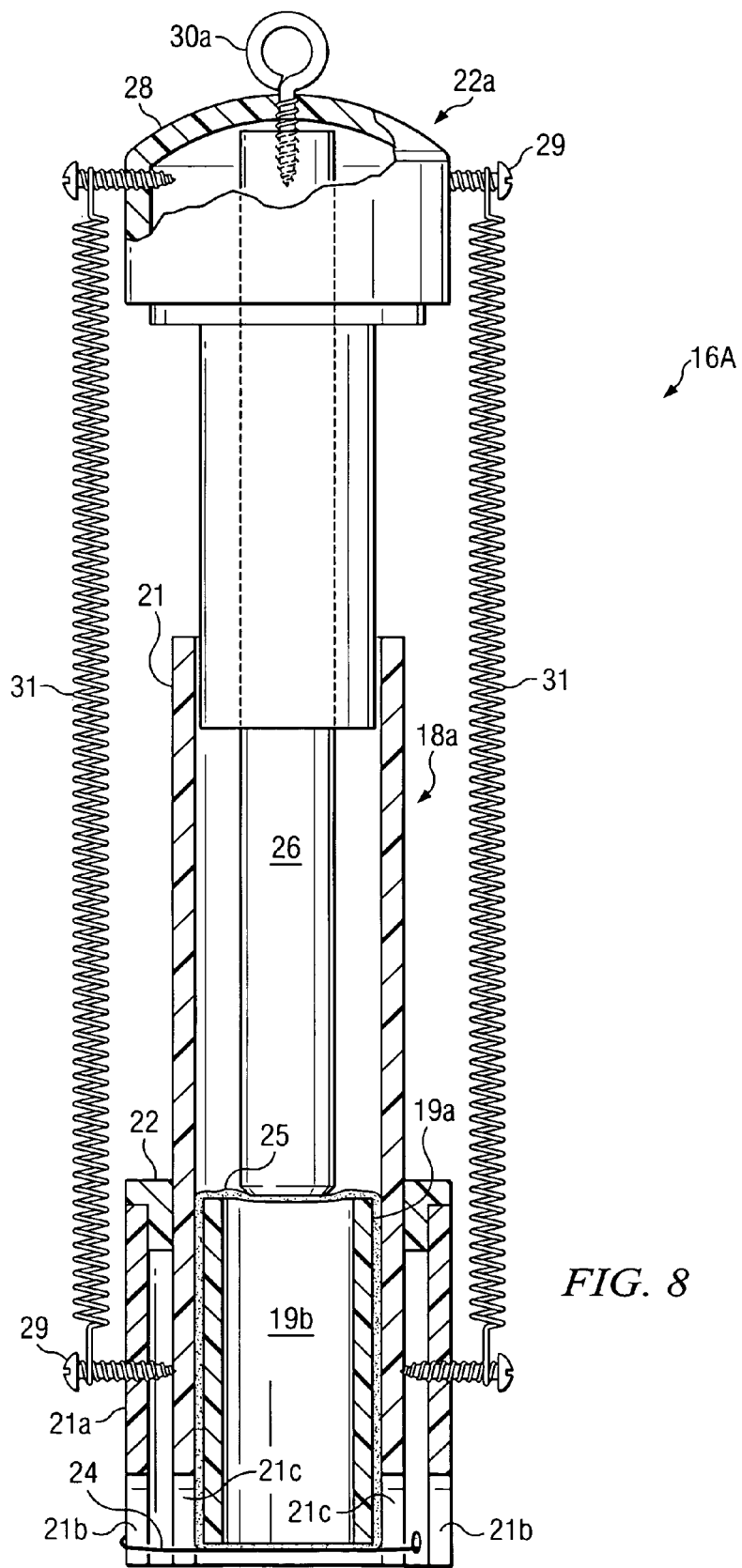
FIG. 8 is an enlarged view, partly in section, of the tripper unit of FIG. 7.

FIGS. 7 and 8 illustrate another embodiment 16A of tripper unit of the present invention. Unit 16A is comprised of a housing 18a which in turn, is comprised of a first cylindrical portion 21 (e.g. PVC tubing, approximately 8 inches long and having a 1.5 inch ID) which runs the entire length of the housing. Housing 18a preferably includes a larger diameter, second portion 21a (e.g. PVC tubing having a 2.5 inch ID) which is secured concentrically around the lower end of first portion 21 by any appropriate means (e.g. PVC reducer 21b, gluing, etc.). The wider diameter of second portion 21a of the housing acts as a base for stabilizing tripper unit 16A when it is stood up in its operable vertical position adjacent hot water heater 11 (FIG. 1). Openings (e.g. radially-spaced slots 21b, 21c, FIGS. 1 and 2A) are provided in lower ends of first and second portions 21, 21a, respectively, to allow any water on floor 15 adjacent heater 11 to flow into the interior of housing 18a for a purpose described below.

Water detection cartridge 19a is preferably comprised of a short length of tubing (e.g. approximately 2.5 to 3 inch length of PVC tubing having a 1 inch ID) and is adapted to easily slide into and out of the lower end of first portion 21 of housing 18a. The inside of hollow cartridge 19a forms a chamber 19b for a purposed described below. A retaining means (e.g. wire 24, a screw(s), or the like) extends into or across the bottom of first portion 21 keeps cartridge 19a in position and prevents it from passing on through the housing. For a purpose explained below, a water reactive material (e.g. absorbent paper, not shown) is loaded onto cartridge 19a which will quickly begin to weaken and disintegrate once it comes into contact with water in the same manner as explained above.

Plunger 22a is comprised of a cylindrical, hollow shaft 26 which is sized to telescope within first portion 20 of housing 18a and slide easily therein. Rod 27 (preferably constructed from steel or the like) extends up through shaft 26 and is secured in place by a eye bolt 30a which, in turn, passes through the top of cap 28 and is threaded into the top of rod 27.

Rod 27 depends from the bottom of shaft 26 and has a reduced diameter that will easily enter and slide through chamber 19*b* in cartridge 19*a* when tripper unit 16 is tripped.

To assemble tripper unit 16A, a prepared cartridge 19*a* is dropped into housing 18*a* and pushed downward until it comes to rest at the bottom of the housing (e.g. on retaining means 24). Plunger 22*a* is then slid into housing 18*a* until the lower end of rod 27 comes to rest on the water absorbent means (e.g. paper towel-like material, not shown). Next, a bias means is provided between plunger 22*a* and housing 18*a* to normally bias the plunger downward with respect to the housing. The bias means is selected so that its downward force is not sufficient to rupture the water absorbent material (i.e. paper) when the material is dry but is sufficient to quickly and dependably force the plunger downward into chamber 19*b* shortly after the material comes into contact with water. While such bias means may take various forms, preferably the bias means, as shown, is comprised of springs 31 (4 shown) which are attached to cap 28 and second portion of housing 18*a* between screws 29, respectively.

Figure 12:
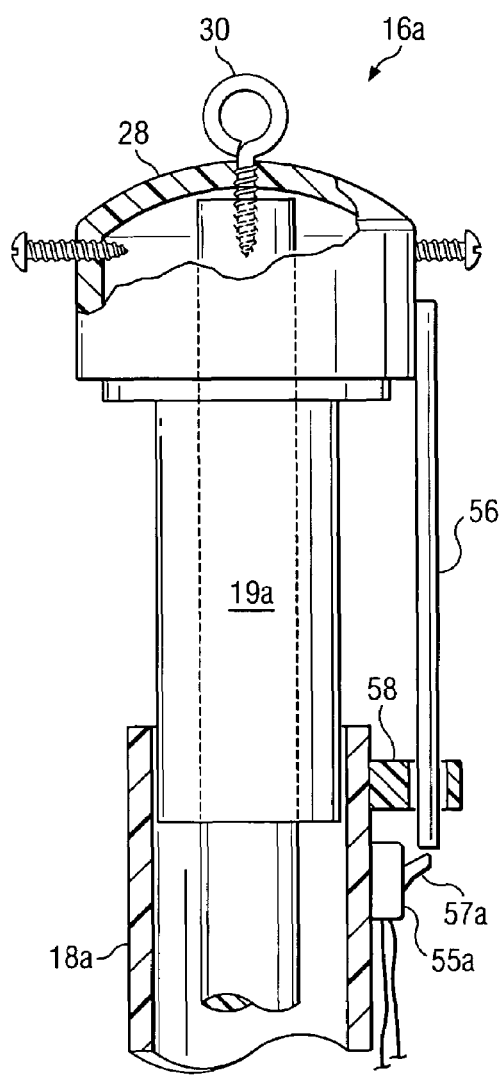
FIG. 12 is a perspective view of a further embodiment of the tripper unit of FIG. 8 which includes a means for actuating a switch to shut off a gas supply line; and While the invention will be described in connection with its preferred embodiments, it will be understood that this invention is not limited thereto. On the contrary, the invention is intended to cover all alternatives, modifications, and equivalents that may be included within the spirit and scope of the invention, as defined by the appended claims.

The embodiment 16B of the tripper unit shown in FIG. 12 is basically of the same construction as unit 16A except unit 16B is also capable of shutting off the flow of gas to a pilot light at the same time the water is shut off to a hot water heater. Tripper unit 16B includes a switch 55*a* which is affixed to housing 18*a*. The switch is electrically connected into the circuitry of the pilot light (not shown) with the switch normally being in closed position to complete the circuit. As plunger 19*a* moves downward, an actuator element 56, which is connected to the cap 28 of the plunger, contacts and moves a throw 57*a* on switch 55*a* downward to open the switch. This breaks the circuit, which then closes the gas valve as if the pilot light had gone out. To insure smooth movement of actuator rod 56 in relation to switch 55*a*, rod 56 is passed through one or more guides 58 (only one shown) which are mounted on housing 18*a*.

Figure 9:
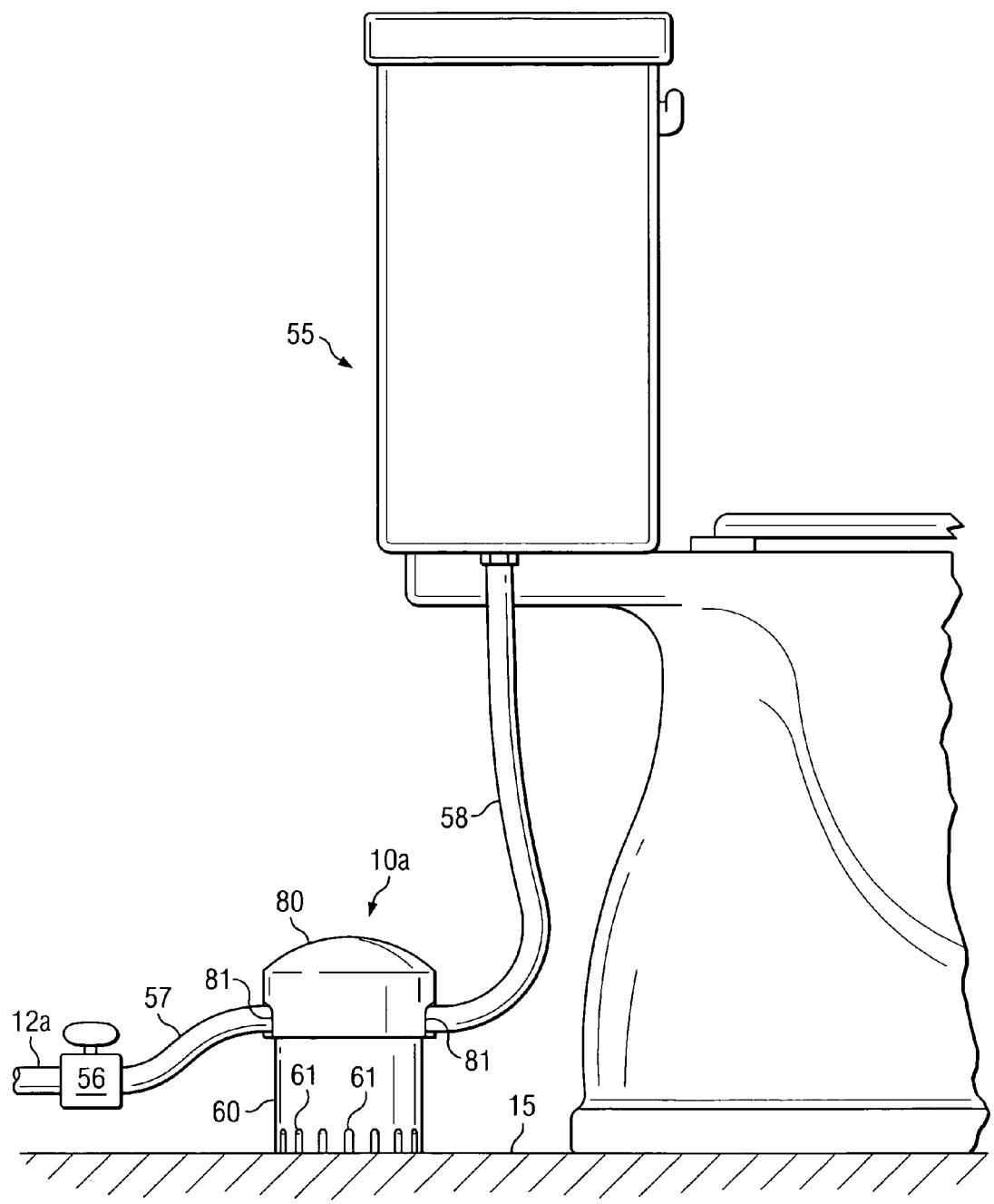
FIG. 9 is a perspective view of a typical commode having another embodiment of the present invention installed thereon.
Figure 10:
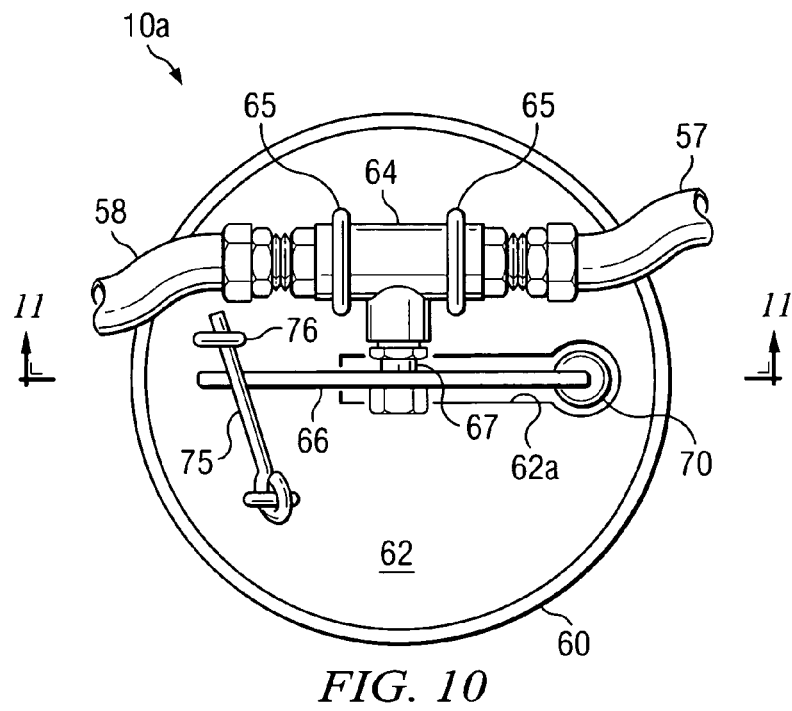
FIG. 10 is an enlarged, top view of the embodiment of the invention shown in FIG. 9 with the top removed.
Figure 11:
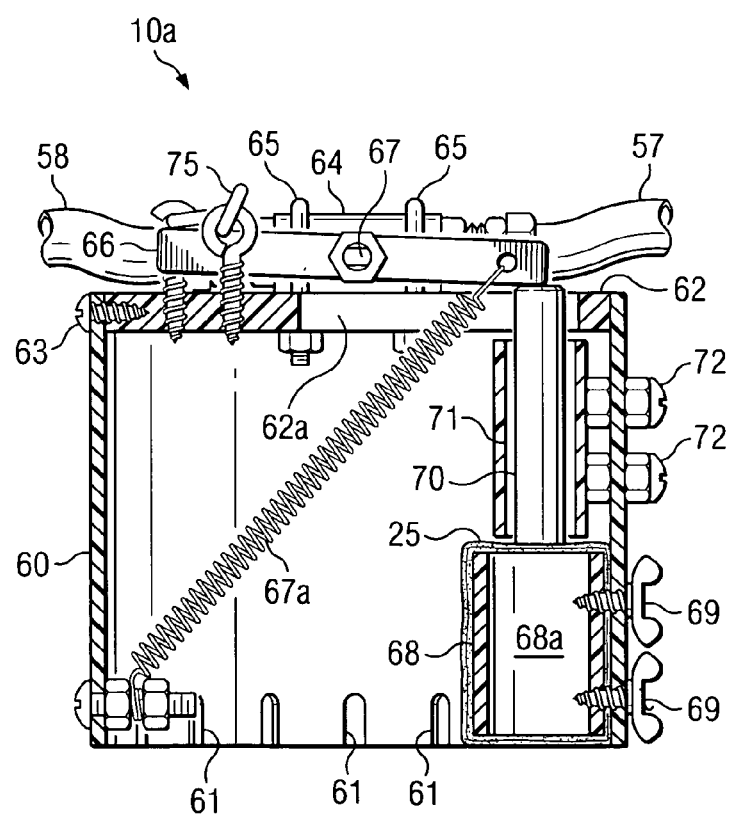
FIG. 11 is a cross section view of the embodiment shown in FIG. 10.

FIGS. 9-11 illustrate an embodiment of the automatic valve shut-off system of the present wherein both the tripper unit and the valve actuator are combined into a single unit 10A. As illustrated in FIG. 9, system 10A is installed to shut-off the flow of water to a standard commode 55 which is positioned on floor 15*a* and to which water is supplied through supply line 12*a*. Again, it should be recognized that unit 10A can equally be used to shut off the water supply to other water-using appliances, e.g. washing machines, dish washers, ice makers, etc.

As will be understood in the art, a standard shut-off valve 56 (e.g. gate valve) is normally provided in line 12*a* to shut off the water, if a need arises. However, in some instances, a leak or overflow can occur that can cause damage or unpleasantness before valve 56 can be manually actuated. In accordance with the present invention, the water line from valve 56 to commode 55 is removed when retrofitting a previously installed commode and is replaced with flexible flow line 57, unit 10*a*, and flexible flow line 58.

Referring now to FIGS. 10 and 11, automatic flow shut-off system 10A is comprised of a housing 60 (e.g. a 3 inch length of 4 inch ID, PVC pipe) having openings 61 spaced around the lower end thereof. The upper end of housing 60 is closed by a plate 62 that has a slot 62*a* therein. Plate 62 can be made from any appropriate material (e.g. metal, plastic, plywood) and is secured in place by any appropriate means (e.g. screws 63).

Ball valve 64 is mounted on plate 62 and is securely affixed thereto by U-bolts 65 or the like. Valve 64 is adapted to be connected between lines 57 and 58 to control flow of water to commode 55. Arm 66 is substantially aligned with slot 62*a* and is connected to shaft 67 of valve 64 which, when rotated, will open and close the valve. A tension spring 67*a* is connected at one end to housing 60 and at its other end to one end of arm 64 as shown in FIG. 6.

The tripping unit of system 10A is comprised of a water detection cartridge 68 which, in turn, is comprised of a short length of tubing (e.g. approximately 1.5 inch length of PVC tubing having a ½ inch ID). Cartridge is secured in the lower end of housing 60 by wing-screws 69 or the like for easy assembly and removable. The inside of hollow cartridge 68 forms a chamber 68*a* for a purposed described below. As before, a water reactive material 69 is loaded onto cartridge 68 which will quickly begin to weaken and disintegrate once it comes into contact with water. Again, a water absorbent paper (e.g. common "paper towels") is preferred since this material is both inexpensive and readily available. The absorbent paper, once wrapped onto the cartridge 68 as described above, is of a sufficient thickness to provide the resistive force necessary to keep the unit from "tripping" as long as the paper remains dry.

Plunger 70 is comprised of a cylindrical rod (e.g. 2½ inch length of ½ inch round stock) which is sized to easily enter and slide through chamber 68*a* in cartridge 68 when tripper unit is tripped. Plunger 70 is slidably positioned within a guide tube 71 which, in turn, is secured inside housing 60 by screws 72.

In operation, arm 66 is rotated counterclockwise as viewed in FIG. 6 to move valve 64 to its open position. This counter-clockwise rotation puts spring 67*a* in tension. To assist in holding arm 66 against the bias of spring 67*a* during installation, a releasable latch 75 (e.g. hook and eye) is mounted on plate 62; the hook of which can be extended across one end of arm to cooperate with the eye on the other side of the arm to hold the arm in the desired position. Cartridge 68 is wrapped with an absorbent paper and is secured into housing 60 by wing-screws 69. Plunger 70 is positioned into guide 71 and so that the lower end of the plunger rests and is supported on the absorbent paper. Latch 75 is released so that one end of arm 66 is biased by spring 67*a* downward into contact with the top of plunger 70. A cover 80 (FIG. 4) is secured to the top of housing to complete the assembly. Cover 80 has diametrically opposed slots 81 to allow the cover to fit over lines 57, 58, respectively.

Again, the absorbent material 69 is of such a strength, when dry, to support the plunger against the bias of spring 67*a*. However, when a leak occurs, water on floor 15*a* will flow through openings 61 in housing 60 and into contact with the absorbent paper 69 on the cartridge. The water "wicks" up the paper and immediately begins to weaken and disintegrate the paper. Within a relatively, very short period (1-2 minutes or less), the paper is weaken to a point that the stored energy in spring 67*a* will force plunger 70 downward to trip the tripping unit and freeing arm 66 to rotate clockwise 90° to thereby close valve 64. This shuts off flow of water to commode 55 thereby limiting any water damage, if any at all, to floor 15*a* and the surrounding area.

While the tripper units of the present invention have been illustrated in conjunction with valve actuators, it should be recognized that the tripper unit, itself, and the principles involved therewith can be used to trigger other devices, e.g. an actuator for setting off an alarm, etc., upon the unexpected presence of water.

What is claimed is:

1. An automatic flow shut-off system for closing a valve in a water supply line to shut off the flow of water to an appliance when a leak develops at said appliance; said system comprising:

a valve actuator adapted to be connected to said valve to close said valve when said valve actuator is actuated; and a tripper unit responsive to said leak for actuating said valve actuator; said tripper unit comprising:

a cylindrical housing adapted to be positioned substantially vertically on a substantially horizontal surface adjacent said appliance when in an operable position, said housing having openings therein to allow the flow of water from said surface into said housing;

a hollow, cartridge mounted in said housing;

a water reactive material across at least one end of said hollow cartridge, the integrity and strength of said material weakening when contacted by water;

a plunger positioned so that the lower end of said plunger rests on and is supported by said water reactive material across said at least one end of said cartridge when said material is dry, said plunger being free to move into said cartridge when said water reactive material comes into contact with water; and means adapted for connecting said plunger to said valve actuator whereby said valve actuator is actuated upon downward movement of said plunger in said housing of said tripper unit.

2. The automatic flow shut-off system of claim 1 wherein said water reactive material comprises:

an absorbent paper material.

3. The automatic flow shut-off system of claim 1 wherein said water reactive material comprises:

a strip of absorbent paper which is wrapped completely around the sides and ends of said cartridge.

4. The automatic flow shut-off system of claim 1 wherein said appliance is a hot water heater with a vertical, cylindrical tank and wherein said tripper unit includes:

a strip adapted to be affixed along the length of said tank, said strip having guides affixed to and space along the length thereof, said guides adapted to slidably receive and guide said plunger; and means for attaching said strip to said tank.

5. The automatic flow shut-off system of claim 4 including:

means for securing said housing of said tripper unit to the lower end of said tank.

6. The automatic flow shut-off system of claim 5 wherein said means for attaching said strip to said tank and said means for attaching said housing to said tank comprise:

hook tape.

7. The automatic flow shut-off system of claim 1 wherein said valve in said supply is a ball valve having a arm for moving said valve between its open and closed position, said valve actuator comprises:

a housing adapted to be secured to said supply line and over said valve;

a torsion spring positioned within said housing having one end attached to said housing and being free at said other end to form a free end which, in turn, forms an impact surface; and a latch lever pivotably mounted on said housing, said lever being adapted to be connected at one end to said means for connecting said plunger to said valve actuator and having a notch near its other end for engaging and releasably latching said free end of said spring in an operable position after said spring has been rotated against its bias for at least 90° whereby said impact surface on said free end of said spring will impact and drive said arm on said valve to its closed position when said latch lever is moved to unlatch said spring.

8. The automatic flow shut-off system of claim 1 wherein said valve in said supply is a gate valve having a stem for moving said valve between its open and closed position, said valve actuator comprises:

a housing adapted to be connected onto said water supply line over said gate valve;

a shaft rotatably mounted in said housing;

a plate affixed to said shaft and adapted to be connected to said stem to rotate therewith;

a coiled spring having a first end connected to said shaft and a second end connected to said housing;

a detent means for releasably latching said shaft against rotation when said valve is in its open position; and means for connecting said detent means to said plunger for releasing said detent means upon downward movement of said plunger in said housing of said tripper unit to thereby allow said spring to move said valve to its closed position.

9. The automatic flow shut-off system of claim 8 wherein said coiled spring is comprised of a clock spring.

10. The automatic flow shut-off system of claim 1 wherein said valve in said supply is a gate valve having a stem for moving said valve between its open and closed position, said valve actuator comprises:

a spool adapted to be connected to said stem to rotate therewith;

a flexible member wound onto said spool and having one end adapted to be attached to a bias means;

a latch arm adapted to engage said spool to releasably latch said spool in a cocked position; and means adapted for connecting said plunger to said latch arm whereby said latch arm is disengaged from said spool upon downward movement of said plunger in said housing of said tripper unit.

11. The automatic flow shut-off system of claim 1 wherein said means for connecting said plunger to said valve actuator comprises:

a length of flexible material connected at one end to said lever and at its other end to said plunger.

12. An automatic flow shut-off system for closing a ball valve in a water supply line to shut off the flow of water to an appliance when a leak develops at said appliance; said system comprising:

a tripper unit responsive to said leak; said tripper unit comprising:

a cylindrical housing adapted to be positioned substantially vertically on a substantially horizontal surface adjacent said appliance when in an operable position, said housing having openings therein to allow the flow of water from said surface into said housing;

means for attaching said housing to said ball valve and into said water supply line and;

a hollow, cartridge mounted in said housing;

a water reactive material across at least one end of said hollow cartridge, the integrity and strength of said material weakening when contacted by water;

a plunger slidably mounted in said housing and positioned so that the lower end of said plunger rests on and is supported by said water reactive material across said at least one end of said cartridge when said material is dry, said plunger being free to move into said cartridge when said water reactive material comes into contact with water;

and a valve actuator comprising:

an arm adapted to be connected to the stem of said ball valve whereby said valve is moved between its open and closed positions when said arm is rotated, said arm positioned so that one end of said arm rests on and is supported on the upper end of said plunger to prevent rotation of said arm to thereby maintain said valve in its open position when said water reactive material is dry; and means for biasing said arm downward against said plunger to thereby move said plunger into said cartridge and rotate said arm to thereby close said valve when said water reactive material comes into contact with water.

13. The automatic flow shut-off system of claim 12 wherein said water reactive material comprises:

an absorbent paper material.

14. The automatic flow shut-off system of claim 12 including:

a plate secured across the upper end of said housing; and wherein said ball valve is attached to said plate.

15. The automatic flow shut-off system of claim 12 including:

a guide secured in said housing above said cartridge; and wherein said plunger is slidably positioned within said guide.

16. A tripper unit for actuating a device upon contact with water, said tripper unit comprising:

a housing adapted to be positioned substantially vertically on a substantially horizontal surface in an area susceptible to a water leak, said housing having openings therein to allow the flow of water from said surface into said housing;

a hollow, cartridge mounted in said housing;

a water reactive material across at least one end of said hollow cartridge, the integrity and strength of said material weakening when contacted by water; and a plunger positioned so that the lower end of said plunger rests on and is supported by said water reactive material across said at least one end of said cartridge when said material is dry, said plunger being free to move into said cartridge when said water reactive material comes into contact with water; and means adapted for connecting said plunger to said device whereby said device is actuated upon downward movement of said plunger.

17. The tripper unit of claim 16 wherein said water reactive material comprises:

an absorbent paper material.

18. The automatic flow shut-off system of claim 16 wherein said water reactive material comprises:

a strip of absorbent paper which is wrapped completely around the sides and ends of said cartridge.

19. The tripper unit of claim 16 wherein said plunger comprises:

a rod of heavy metal;

and wherein said tripper unit includes:

a strip adapted to be affixed to an appliance, said strip having guide means thereon for slidably receiving said rod.

20. The tripper unit of claim 19 including:

an electrical switch affixed to said strip, said switch having a throw extending outward therefrom for moving said switch between its open and closed positions; and a collar affixed to said plunger and positioned to contact and move said throw downward to open said switch as said plunger moves downward.

* * * * *